United States Patent
Gudim et al.

(10) Patent No.: US 7,752,828 B2
(45) Date of Patent: Jul. 13, 2010

(54) LOADING APPARATUS AND RELATED METHOD FOR LOADING EDIBLE ITEMS INTO TRAYS

(75) Inventors: Damien M. Gudim, Troy, OH (US); Rohan V. Patel, Troy, OH (US); Allen L. York, Jackson Center, OH (US); Ankush B. Mittal, Sidney, OH (US)

(73) Assignee: Illinois Tool Works, Inc., Glenview, IL (US)

( * ) Notice: Subject to any disclaimer, the term of this patent is extended or adjusted under 35 U.S.C. 154(b) by 13 days.

(21) Appl. No.: 12/142,352

(22) Filed: Jun. 19, 2008

(65) Prior Publication Data

US 2009/0313955 A1  Dec. 24, 2009

(51) Int. Cl.
*B65B 35/30* (2006.01)

(52) U.S. Cl. ............ 53/534; 53/251; 53/257; 53/475; 198/803.4; 198/803.11; 198/867.08

(58) Field of Classification Search .......... 53/475, 53/246, 251, 257; 198/867.08, 803.4, 803.11, 198/817, 731, 627, 626.6, 419.2, 419.3, 418.1
See application file for complete search history.

(56) References Cited

U.S. PATENT DOCUMENTS

| | | | |
|---|---|---|---|
| 3,290,859 A | 12/1966 | Talbot | |
| 3,325,977 A * | 6/1967 | Kirsten | 53/250 |
| 4,044,885 A | 8/1977 | Rose et al. | |
| 4,098,392 A * | 7/1978 | Greene | 198/419.3 |
| 4,226,073 A | 10/1980 | Rose et al. | |
| 4,413,462 A | 11/1983 | Rose | |
| 4,571,236 A * | 2/1986 | Adams | 493/319 |
| 4,641,742 A * | 2/1987 | Igarashi et al. | 198/626.5 |
| 4,718,540 A * | 1/1988 | Greenwell | 198/620 |
| 4,736,570 A | 4/1988 | Hardage et al. | |
| 4,893,707 A * | 1/1990 | Langen et al. | 198/626.3 |
| 5,038,919 A * | 8/1991 | Harston | 198/626.1 |
| 5,238,101 A * | 8/1993 | Ota et al. | 198/626.5 |
| 5,460,843 A | 10/1995 | Greene | |
| 5,761,883 A | 6/1998 | Pruett et al. | |
| 6,161,678 A * | 12/2000 | Cassoli et al. | 198/626.6 |
| 6,260,690 B1 * | 7/2001 | Batzer | 198/626.5 |
| 6,293,544 B1 * | 9/2001 | Fedinatz | 271/243 |
| 6,840,369 B2 | 1/2005 | Derenthal et al. | |

FOREIGN PATENT DOCUMENTS

| | | |
|---|---|---|
| DE | 19915271 | 10/2000 |
| DE | 102006007986 | 8/2007 |
| GB | 1079657 | 8/1967 |
| GB | 2158411 | 11/1985 |

* cited by examiner

*Primary Examiner*—Thanh K Truong
(74) *Attorney, Agent, or Firm*—Thompson Hine LLP (57) ABSTRACT

An apparatus that loads horizontally oriented slugs of edible, edge-standing items into trays includes a tray delivery mechanism having a tray infeed for receiving trays, a tray outfeed from which filled trays can be removed from the apparatus and a tray conveyor that moves the trays from the tray infeed to the tray outfeed. An over head transfer mechanism is disposed above the tray conveyor. The over head transfer mechanism includes a pusher flight and a retainer flight. The pusher flight and retainer flight are configured to cooperate to transfer a pre-selected number of edge-standing items forming the slug from a counting conveyor to a tray loading area. The overhead transfer mechanism includes a flight adjustment system that adjusts a distance between the retainer flight and the pusher flight to change the pre-selected number of edge-standing items transferred by the over head transfer mechanism from the counting conveyor to the tray loading area.

16 Claims, 9 Drawing Sheets

LOADING APPARATUS AND RELATED METHOD FOR LOADING EDIBLE ITEMS INTO TRAYS

TECHNICAL FIELD

This application relates generally to food handling systems and more particularly to a loading apparatus and method for loading edible articles such as cookies or crackers into trays.

BACKGROUND

Systems are known that assemble, count and load cookies into trays. The systems may include a sandwiching machine that forms sandwiches by placing cream or other filling between two cookies. The sandwiches are then counted and separated into groups or slugs, which are then loaded onto trays. Examples of such apparatus are described by U.S. Pat. Nos. 3,290,859 and 4,226,073, the details of which are incorporated by reference.

In some instances, requirements may dictate that a change in slug size is needed. That is, in one run, a slug size of five cookies or sandwiches may be required for a particular number of trays. In another run, however, a slug size of 12 cookies or sandwiches may be required. In order to change between different slug sizes, it was required to exchange certain parts of known tray loading apparatus, which could take considerable time and effort. Greater flexibility and ease of changeover between slug sizes is desired.

SUMMARY

In an aspect, an apparatus that loads horizontally oriented slugs of edible, edge-standing items into trays includes a tray delivery mechanism having a tray infeed for receiving trays, a tray outfeed from which filled trays can be removed from the apparatus and a tray conveyor that moves the trays from the tray infeed to the tray outfeed. An over head transfer mechanism is disposed above the tray conveyor. The over head transfer mechanism includes a pusher flight and a retainer flight. The pusher flight and retainer flight are configured to cooperate to transfer a pre-selected number of edge-standing items forming the slug from a counting conveyor to a tray loading area. The overhead transfer mechanism includes a flight adjustment system that adjusts a distance between the retainer flight and the pusher flight to change the pre-selected number of edge-standing items transferred by the over head transfer mechanism from the counting conveyor to the tray loading area.

In another aspect, a method of loading horizontally oriented slugs of edible, edge-standing items into trays is provided. The method includes moving trays from a tray infeed to a tray outfeed using a tray delivery mechanism. The tray delivery mechanism includes a tray conveyor moving the trays from the tray infeed to the tray outfeed. A pre-selected number of the edge-standing items forming the slug are transferred from a counting conveyor to a tray loading area using an over head transfer mechanism disposed above the tray conveyor. The over head transfer mechanism includes a pusher flight and a retainer flight. The pusher flight and retainer flight cooperate to transfer the pre-selected number of edge-standing items forming the slug from the counting conveyor to the tray loading area. A distance between the retainer flight and the pusher flight is adjusted using a flight adjustment system to change the pre-selected number of edge-standing items being transferred by the over head transfer mechanism from the counting conveyor to the tray loading area.

In another aspect, an apparatus that forms and loads horizontally oriented slugs of edible, edge-standing items into trays includes a sandwiching system configured to assemble the edge-standing items. The sandwiching system includes an infeed and an outfeed. A tray delivery mechanism has a tray infeed for receiving trays, a tray outfeed from which filled trays can be removed from the apparatus and a tray conveyor that moves the trays from the tray infeed to the tray outfeed. An over head transfer mechanism is disposed above the tray conveyor. The over head transfer mechanism includes a pusher flight and a retainer flight. The pusher flight and retainer flight are configured to cooperate to transfer a pre-selected number of edge-standing items forming the slug delivered from the outfeed of the sandwiching system to a tray loading area. The overhead transfer mechanism includes a flight adjustment system that adjusts a distance between the retainer flight and the pusher flight to change the pre-selected number of edge-standing items being transferred by the over head transfer mechanism to the tray loading area.

The details of one or more embodiments are set forth in the accompanying drawings and the description below. Other features, objects, and advantages will be apparent from the description and drawings, and from the claims.

DETAILED DESCRIPTION

Figure 1:
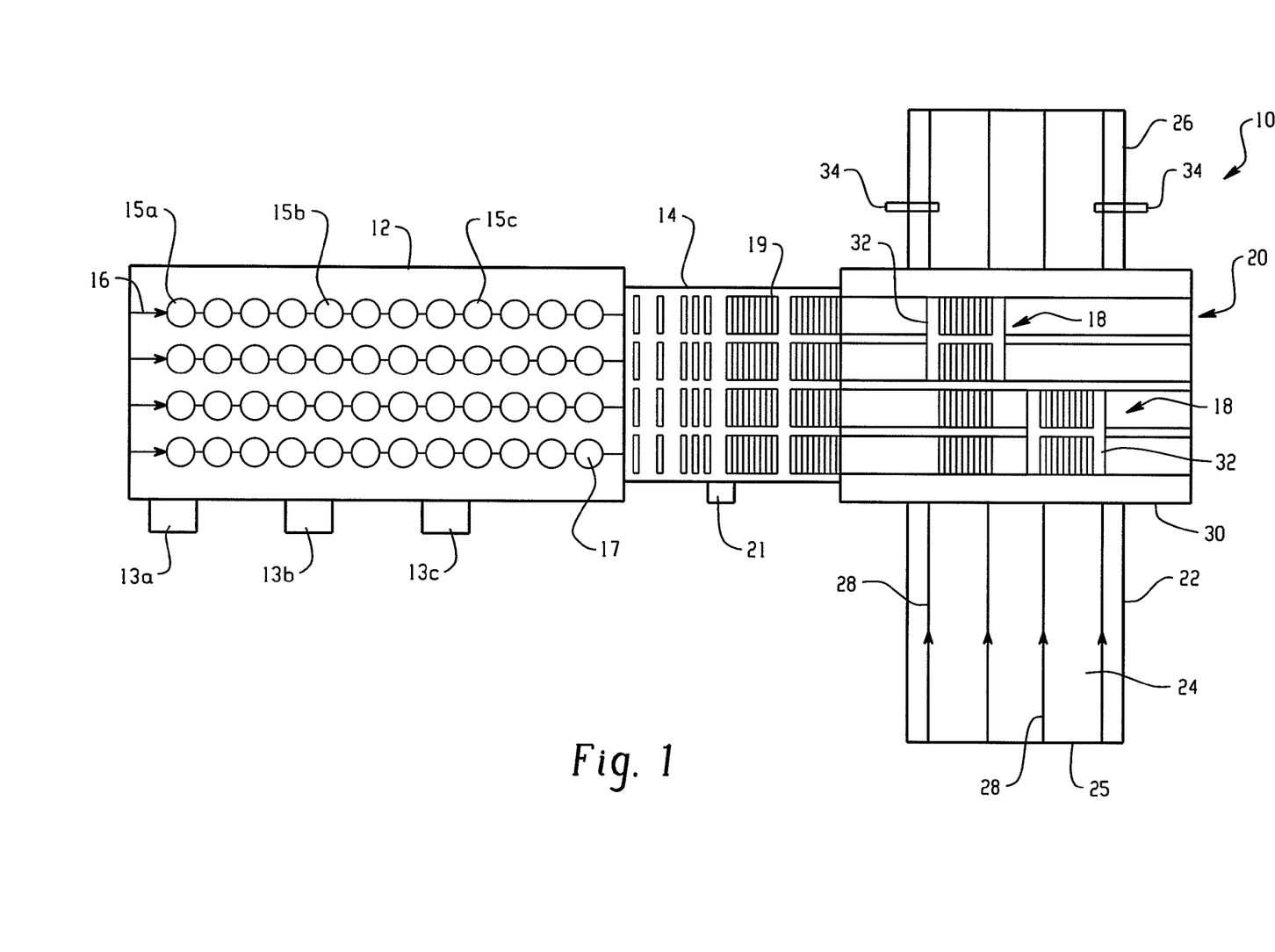
FIG. 1 is a diagrammatic, plan view of an embodiment of an apparatus for filling trays with edge-standing edible items.

Referring to FIG. 1, an apparatus 10 for forming cookie sandwiches and filling trays with the cookie sandwiches includes a sandwiching machine 12 that receives cakes at a cake infeed 13 and places cream or some other filling type between cakes to form cookie sandwiches. In the illustrated embodiment, the apparatus 10 forms a three-layer cookie sandwich with a first end cake, cream, a middle cake, cream and a second end cake. A conveyor 16 transports the sandwiches through the sandwiching machine 12. The cakes are fed into the sandwiching machine (manually and/or automatically) at each cake infeed 13. The first end cake 15a is fed at cake infeed 13a and cream is placed on top of that first end cake with the cake in a horizontal orientation, i.e., with its face substantially parallel with the conveyance path of the sandwiching machine 12. The middle cake 15*b* is placed on top of the cream at infeed 13*b* and cream is placed on top of the middle cake. The second end cake 15*c* is placed on top of the second cream layer at infeed 13*c* to form the completed cookie sandwich. The sandwiched cookies may then be passed by a pressure shoe (not shown) for each of the lines of cookie sandwiches, exerting pressure on the sandwiched cookies 17.

A counting conveyor 14 receives the cookie sandwiches 17 from the sandwiching machine 12. At the counting conveyor 14, the cookie sandwiches 17 are oriented vertically onto their edges, i.e., with the cake faces substantially perpendicular to the conveyance path. The counting conveyor 14 then counts the cookie sandwiches 17 using a counting mechanism 21 and separates the sandwiches into slugs 19 of a pre-selected number of sandwiches (e.g., between five and 22 cookie sandwiches) in accordance with tray size requirements.

In the illustrated embodiment, up to four rows of cookie sandwiches 17 are formed and transported through the sandwiching machine 12 and the counting conveyor 14. The use of four rows can be used to fill trays having, for example, four cookie-receiving cells. The apparatus 10 can also be used to fill trays having more or less than four cookie-receiving cells. In other embodiments, the apparatus 10 may be provided with more or less than four rows. The term "cookie" is meant to include sandwich and non-sandwich cookie types. For example, the apparatus 10 can be used to fill trays with non-sandwich-type cookies or even other edible items such as crackers.

A tray loader 30 includes a tray delivery mechanism 22 and an overhead transfer apparatus 20. The tray delivery mechanism 22 is used to transport trays using a tray conveyor 24 from a tray infeed 25 where empty trays are introduced to the tray delivery mechanism, to tray loading regions 18 where the sandwiches are dropped into the tray. Trays can be automatically or manually fed onto the tray infeed 25. From the loading regions 18, the tray conveyor 24 transports the filled trays to a tray outfeed 26 where the filled trays can be removed from the tray loader 30. The tray conveyor 24 includes multiple belts 28, which provide flexibility in the number of trays fed to the tray loading regions 18 depending, for example, on the type of trays (e.g., single cell, dual cell, etc.) being filled. As can be seen, the conveyance path of the trays is substantially perpendicular to the conveyance path of the cookie sandwiches.

The slugs 19 of cookie sandwiches 17 are transferred from the counting conveyor 14 to the tray loading regions 18 using the overhead transfer apparatus 20. The overhead transfer apparatus 20 is located above the tray delivery mechanism 22 and transfers the slugs of cookie sandwiches from the counting conveyor 14 to a drop gate 32 located at the loading regions 18. In this embodiment, two loading regions 18 are included, however, in other embodiments, there may be more or less loading regions depending, for example, on the number of sandwich rows. The drop gates 32 are opened during a dwell in the travel of the overhead transfer apparatus 20 thereby allowing the cookie sandwiches 17 to drop through the drop gates into the cells of the tray.

The trays can be positioned beneath the drop gates 32 by moveable stops 34 that retain the trays from movement along the tray conveyor 24 during a sandwich loading operation and to space the trays of loaded sandwiches as discharged from the tray conveyor.

Figure 2:
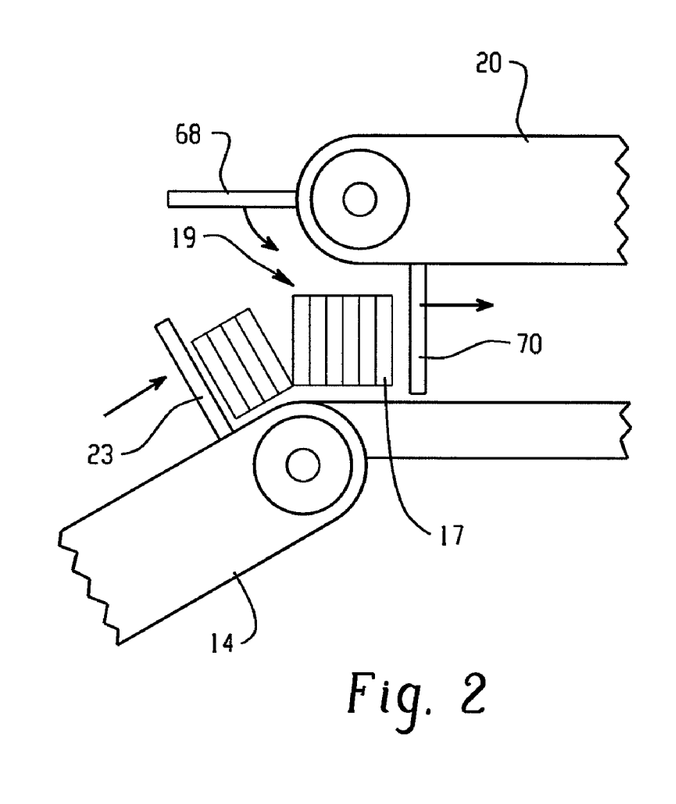
FIGS. 2 and 3 illustrate the transfer of slugs of cookie sandwiches from a counting conveyor to a overhead transfer apparatus of the apparatus of FIG. 1.
Figure 3:
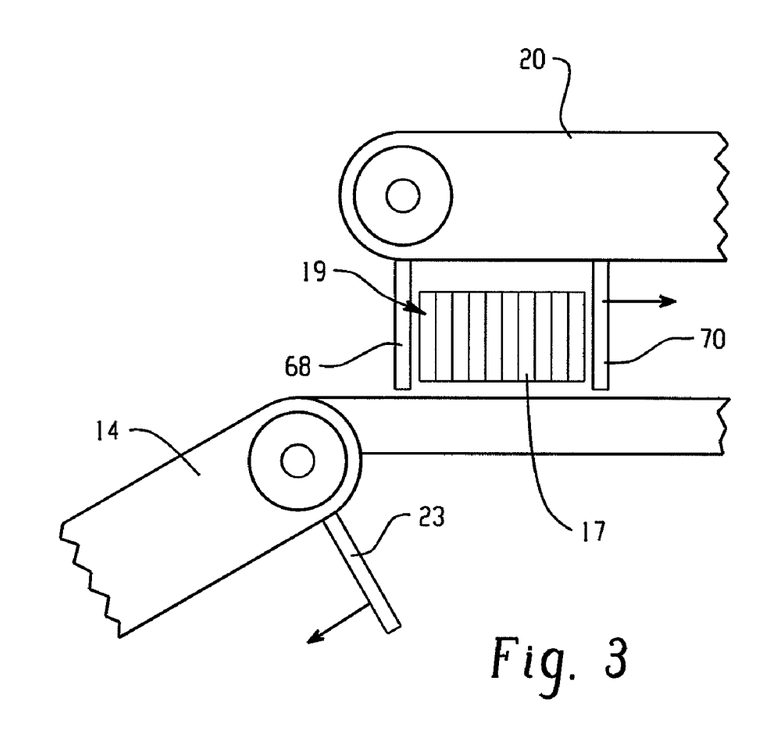

FIGS. 2 and 3 illustrate the transfer of the slugs 19 of cookie sandwiches 17 from the counting conveyor 14 to the overhead transfer apparatus 20. After the cookie sandwiches 17 are counted and grouped into slugs 19, pusher 23 of the counting conveyor 14 pushes the slug 19 to the overhead transfer apparatus 20. The overhead transfer apparatus 20 includes pusher flights 68 and the retainer flights 70 that are used to move the slugs 19 to the loading regions 18, while keeping the cookie sandwiches in their edge-standing configuration. Referring particularly to FIG. 2, the timing of the counting conveyor 14 and the overhead transfer apparatus 20 is coordinated such that the slug 19 of cookie sandwiches 17 is introduced to the retainer flight 70 as the pusher flight 68 moves around a front end 27 of the overhead transfer apparatus 20. Referring particularly to FIG. 3, the pusher flight 68 then comes in behind the slug 19 and pushes the slug toward the loading region 18.

Figure 4:
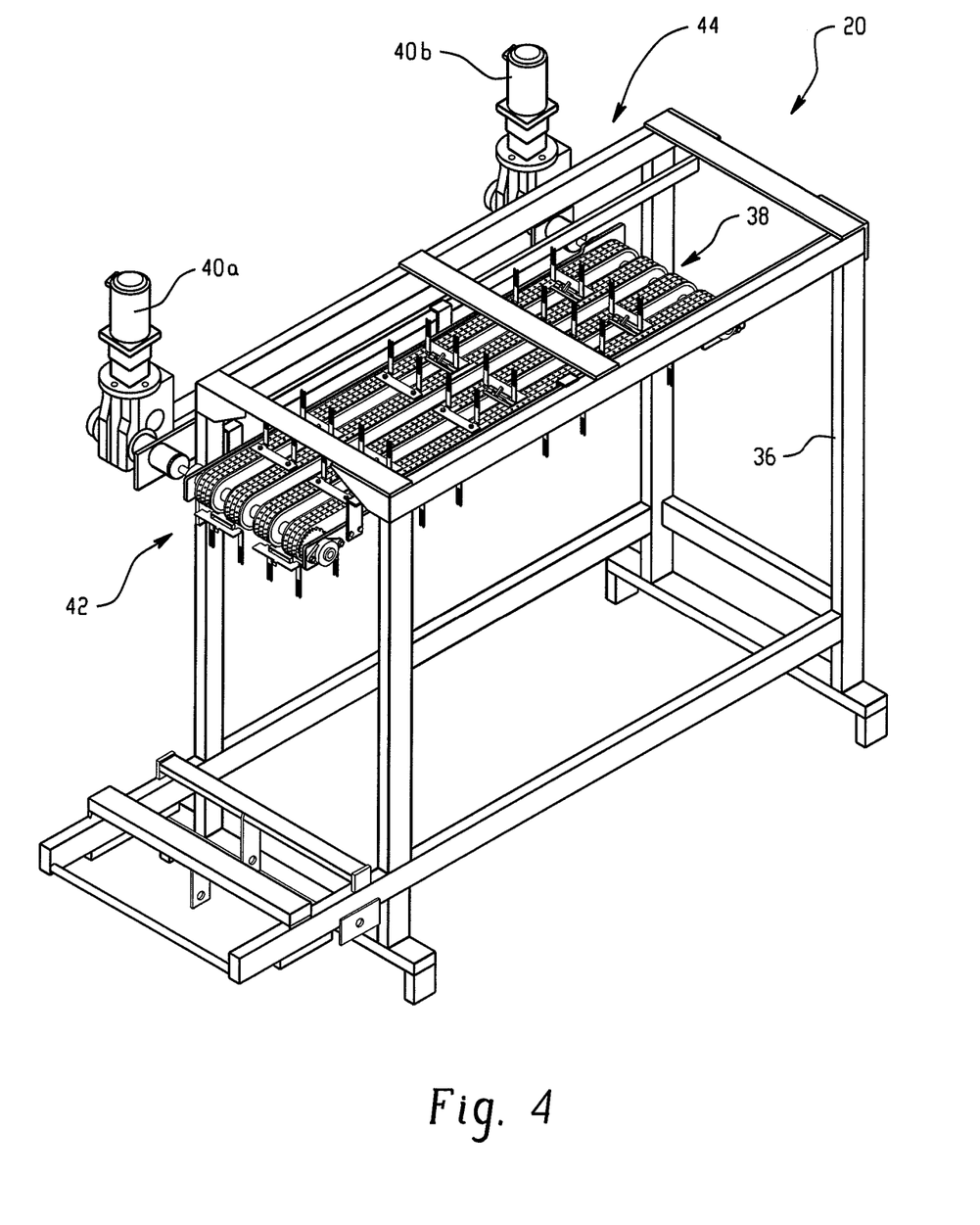
FIG. 4 is a perspective view of an embodiment of an overhead transfer apparatus for use in the apparatus of FIG. 1.

Referring now to FIG. 4 showing details of the overhead transfer apparatus 20, the overhead transfer apparatus includes a frame assembly 36, an overhead transfer assembly 38 and servo motors 40*a* and 40*b* that drive the overhead transfer assembly. The frame assembly 36 is sized to straddle the tray delivery mechanism 22 such that the overhead transfer assembly 38 is positioned above the tray conveyor 24. Servo motor 40*a* is used to drive a front shaft drive assembly 42 and servo motor 40*b* is used to drive a rear shaft drive assembly 44 (FIG. 3).

Figure 5:
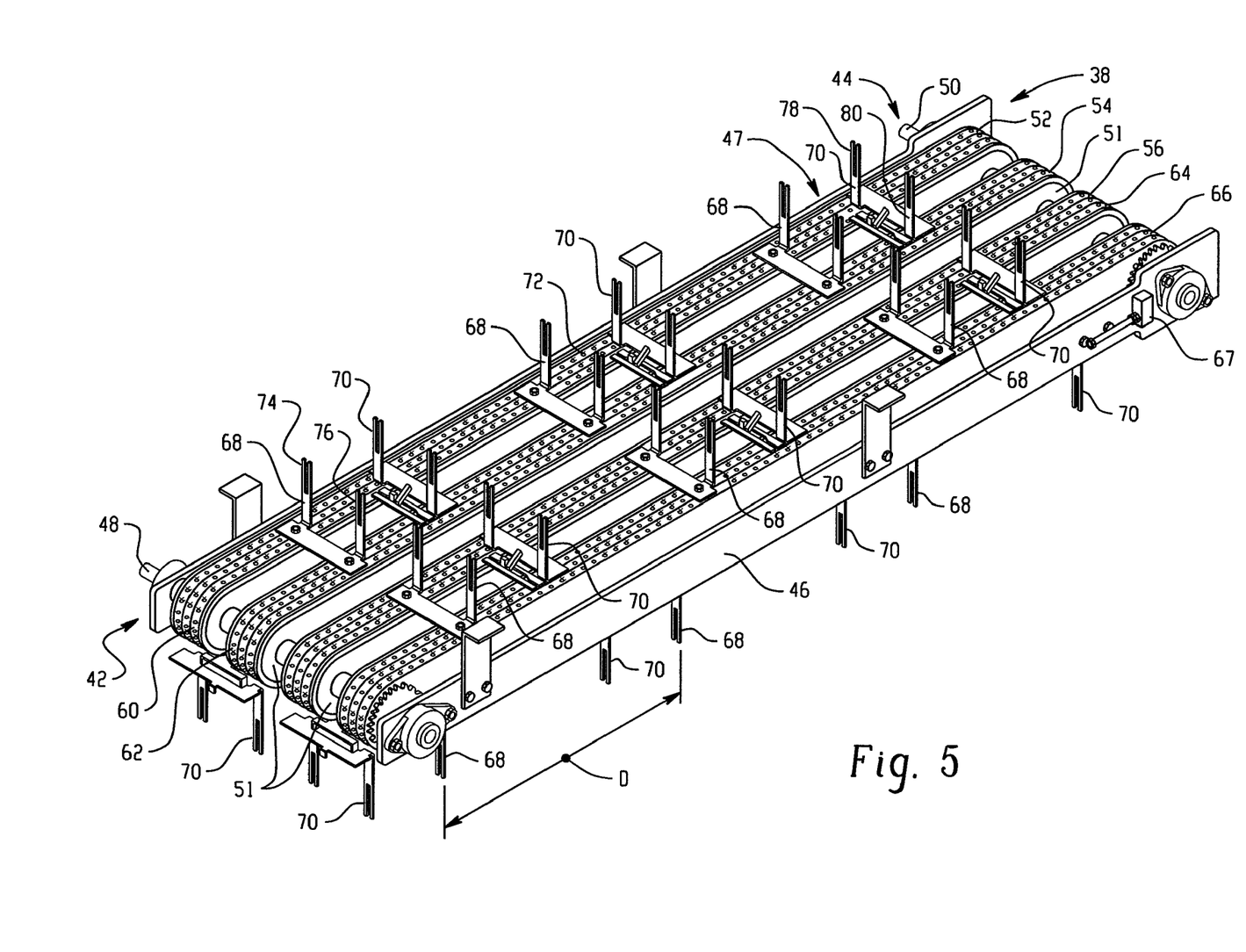
FIG. 5 is a perspective view of an embodiment of an overhead transfer assembly for use with the overhead transfer apparatus of FIG. 4.

Referring to FIG. 5, the overhead transfer assembly 38 is shown in isolation. The overhead transfer assembly 38 includes a frame 46 through which drive shafts 48 and 50 of the front shaft drive assembly 42 and the rear shaft drive assembly 44 extend. The servo motors 40*a* and 40*b* move respective parts of a chain drive assembly 47. Servo motor 40*a* drives the front shaft drive assembly 42 which includes the drive shaft 48 and servo motor 40*b* drives the rear shaft drive assembly 44 which includes the drive shaft 50. The front shaft drive assembly 42 and the rear shaft drive assembly 44 drive different ones of a number independent chain assemblies.

Figure 6:
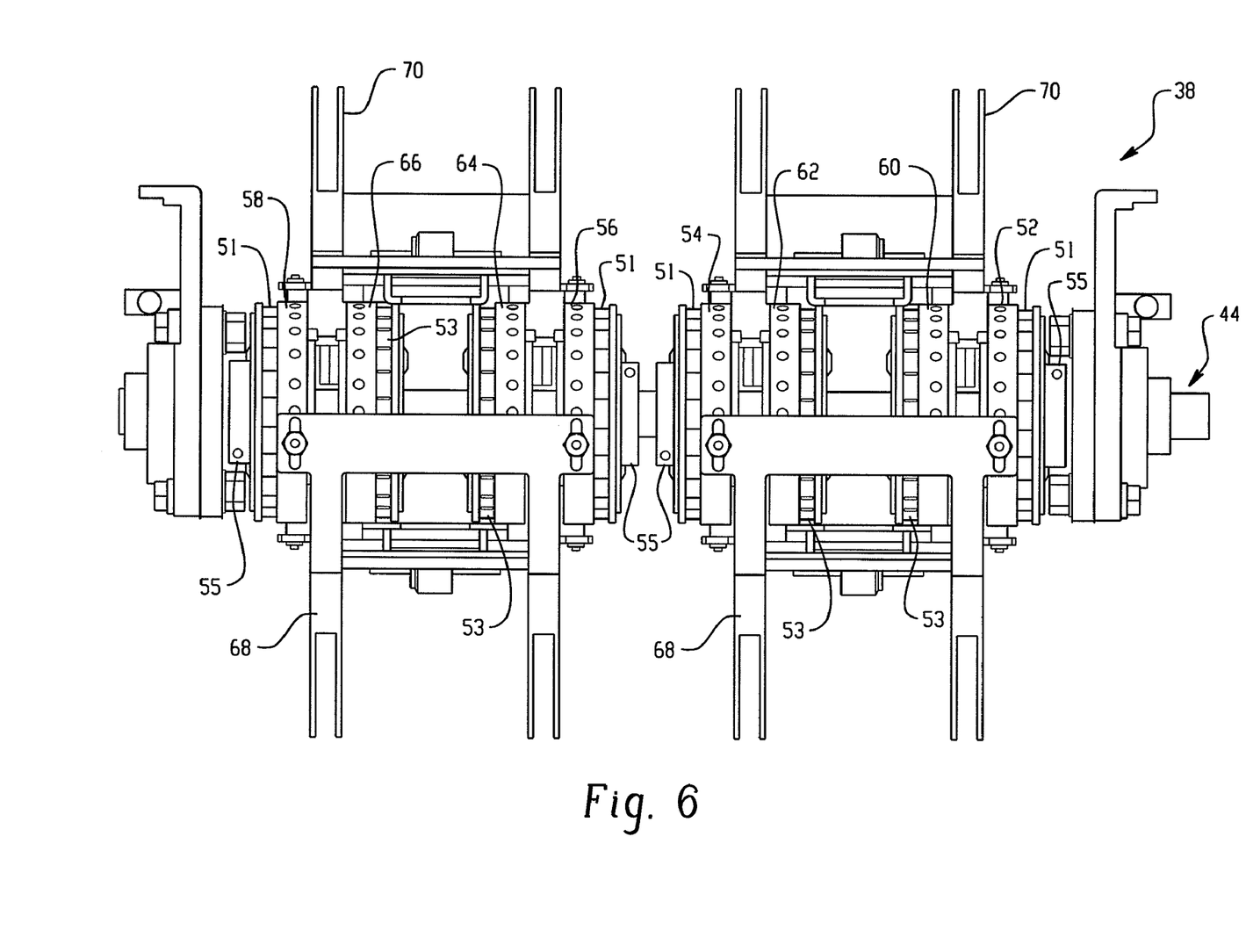
FIG. 6 is an end view of the overhead transfer assembly of FIG. 5.

Each drive shaft 48 and 50 moves its associated chain assemblies using bearing and keyed shaft sprockets 51 and 53, respectively. In one embodiment, referring also to FIG. 6, the front shaft drive assembly 42 drives only outer chain assemblies 52, 54, 56 and 58 and the rear shaft drive assembly 44 drives only the inner chain assemblies 60, 62, 64 and 66. In the end view of FIG. 6, shaft sprockets 51 include a bearing 55 that allows the shaft 50 to rotate relative to the shaft sprocket 51 so that the outer chain assemblies 52, 54, 56 and 58 do not move due to rotation of shaft 50. Shaft sprockets 53 are keyed to the shaft 50 such that they rotate with the shaft 50 to cause the inner chain assemblies 60, 62, 64 and 66 to move. While not shown by FIG. 6, shaft sprockets 51 with bearings 55 are also provided for the front shaft drive assembly 42 that allow the front shaft 48 to rotate relative to the shaft sprocket 51 so that the inner chain assemblies 60, 62, 64 and 66 do not move due to rotation of the shaft 48 and shaft sprockets 53 are keyed to shaft 48 such that they rotate with the shaft 48 to move the outer chain assemblies 52, 54, 56 and 58. In another embodiment, the rear shaft drive assembly 44 drives only outer chain assemblies 52, 54, 56 and 58 and the front shaft drive assembly 42 drives only the inner chain assemblies 60, 62, 64 and 66.

Pusher flights 68 are connected to the outer chain assemblies 54, 54, 56 and 58. Retainer flights 70 are connected to the inner chain assemblies 60, 62, 64 and 66. Referring back to FIG. 3, a chain tensioner assembly 67 is used to maintain tension in the chain assemblies.

The pusher flights 68 and the retainer flights 70 are aligned in two rows and are connected to their associated chain assemblies using releasable fasteners that are inserted into openings 72 through the chain assemblies. The openings 72 extend along the length of the chain assemblies in a spaced-apart fashion to provide multiple connection points for the pusher and retainer flights 68 and 70 along the lengths of their associate chain assemblies. The pusher flights 68 are separated apart from each other a predetermined distance D of between about 14 and 22 inches, such as 18 inches. In some embodiments, the retainer flights 70 are also separated apart from each other a predetermined distance of between about 14 and 22 inches, such as about 18 inches.

Each pusher flight 68 includes a first pair of pusher fingers 74 and a second pair of pusher fingers 76. Likewise, each retainer flight 70 includes a first pair of retainer fingers 78 and a second pair of retainer fingers 80.

Figure 7:
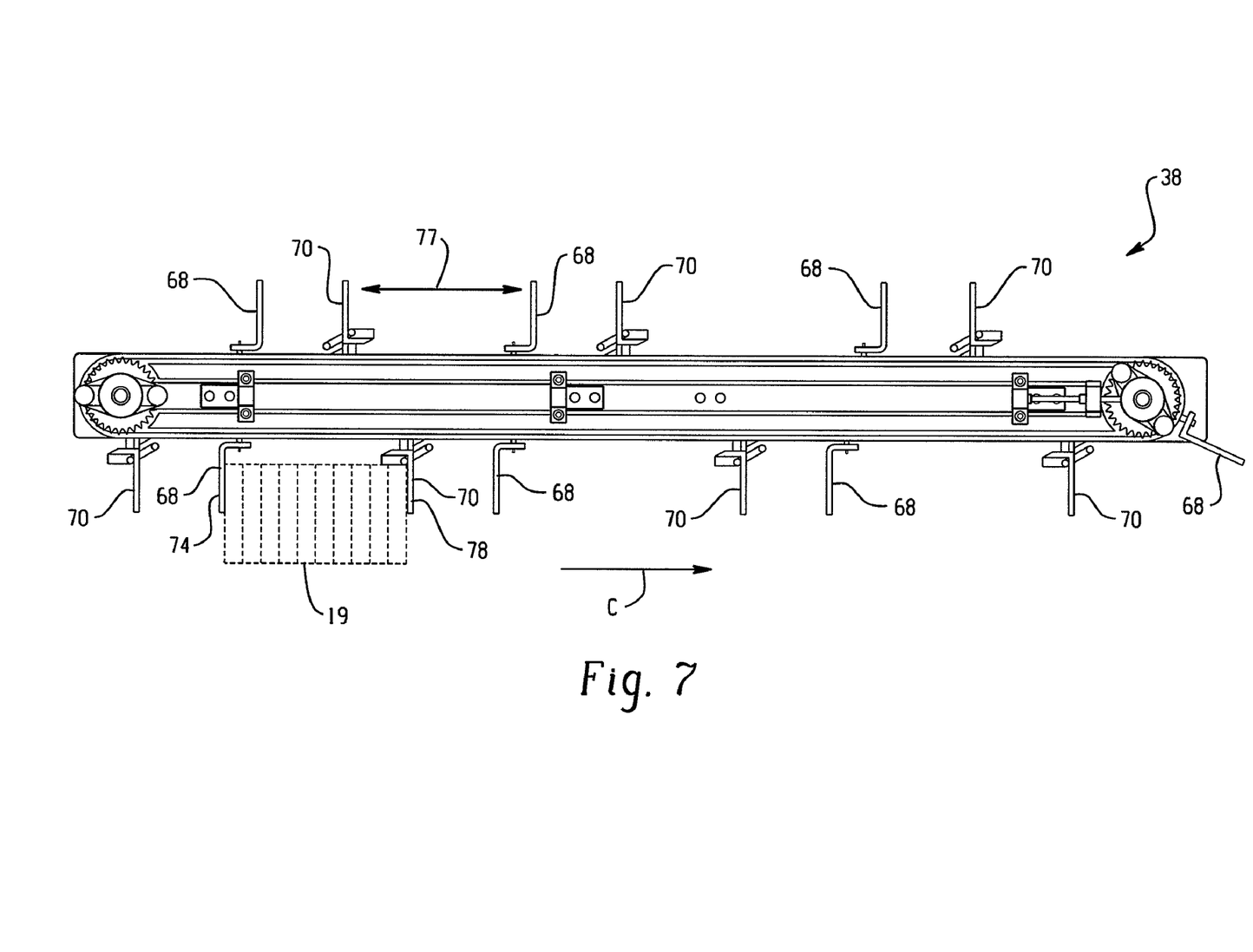
FIG. 7 is a side view of the overhead transfer mechanism of FIG. 5.

Referring to FIG. 7, the first pair of pusher fingers 74 cooperates with the first pair of retainer fingers 78 in transferring one slug 19 of cookie sandwiches from the counting conveyor 14 to the loading region 18 while the second pair of pusher fingers 76 cooperates with the second pair of retainer fingers 80 in transferring a second slug of cookie sandwiches from the counting conveyor to the loading region (only the first pair of pusher and retainer fingers 74 and 78 are shown by FIG. 7). Relative to the conveying direction C, the pusher fingers 74 are located at the upstream side of the slug 19 to push the slug toward the loading region 18 while helping to maintain the cookie sandwiches in their edge-standing configurations. The retainer fingers 78 are located at the downstream side of the cookie sandwiches to prevent the cookie sandwiches from falling forward thereby helping to maintain the cookie sandwiches in their edge-standing configurations. The pusher flight 68 is spaced from the retainer flight 70 to transfer two slugs of 14 cookie sandwiches with each cookie sandwich having a thickness of about ⅝ inch. As will be described in greater detail below, the overhead transfer apparatus 20 includes a flight adjustment system that is used to adjust distance between the retainer flights 70 and the pusher flights 68 to change the number of cookie sandwiches (i.e., the slug size) transferred by the over head transfer assembly 38.

Figure 8:
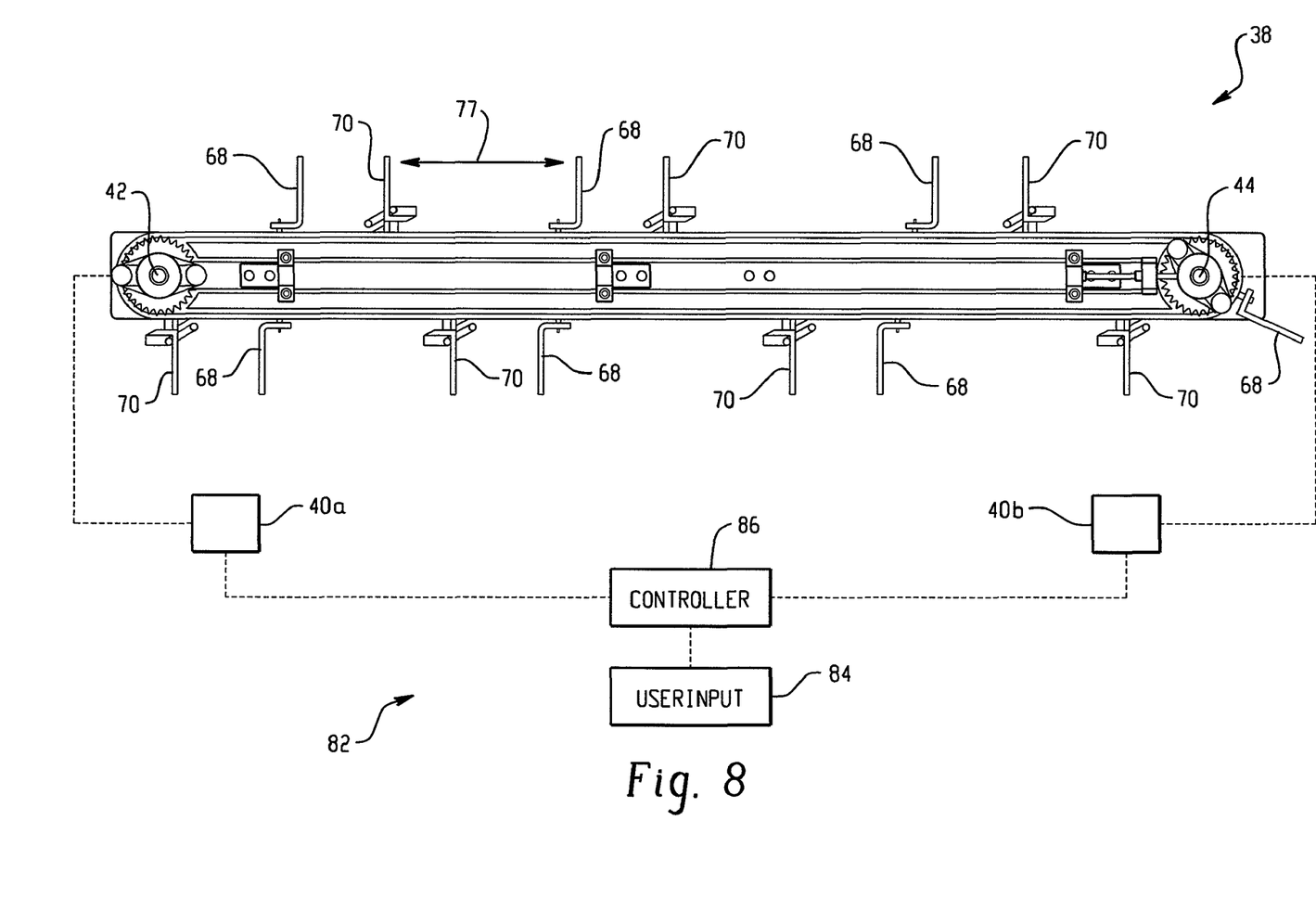
FIG. 8 is a diagrammatic illustration of an embodiment of a flight adjustment system for use with the overhead transfer apparatus of FIG. 4.

Referring to FIG. 8, the flight adjustment system (generally referred to as element 82) includes a user input device 84 (e.g., including a touch screen, keypad, etc.) that is connected to a controller 86. The user input device 84 can be connected to the controller 86 through any suitable connection including any suitable client-client and client-server connection using, for example, a local area network (LAN) or a wide area network (WAN) including the Internet. In some embodiments, the user input device 84 and the controller 86 are part of the same device. The controller 86 includes a processor that processes a user input received from the user input device 84.

As mentioned above, the flight adjustment system 82 is used to adjust the distance between the retainer flights 70 and the pusher flights 68. The controller 86 is connected to the servo motors 40a and 40b which are, in turn, connected to the front shaft drive assembly 42 and the rear shaft drive assembly 44, respectively. The front and rear shaft drive assemblies 42 and 44 can be used to move the retainer and pusher flights 70 and 68 independently in opposite directions toward and away from each other through their linkages via the chain assemblies.

Figure 9:
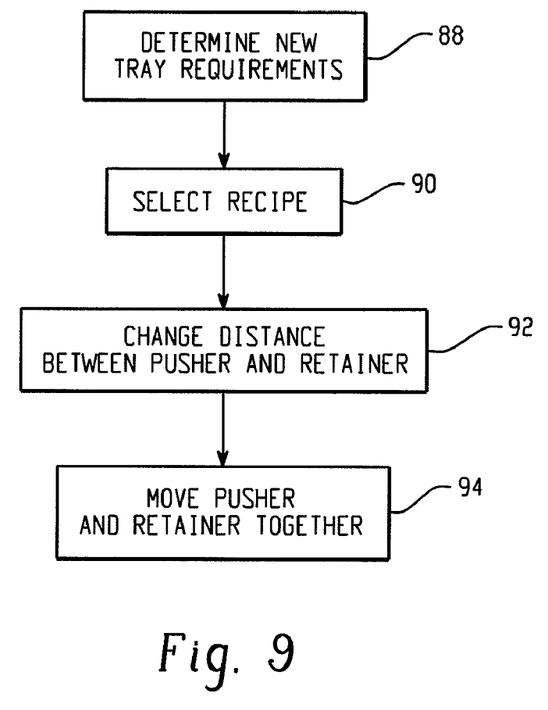
FIG. 9 is an embodiment of a method of adjusting a distance between flights of the overhead transfer assembly using the flight adjustment system of FIG. 8.

FIG. 9 illustrates a method 85 of adjusting a distance between the retainer flight 70 and the pusher flight 68 using the flight adjustment system 82. At step 88, the operator determines that tray requirements dictate that the number of cookie sandwiches per slug needs to be changed (e.g., from 12 cookie sandwiches to 22 cookie sandwiches). The operator then provides a corresponding input using the user input device 84 at step 90. Based on this input, the controller 86 actuates one or both of the servo motors 40a and 40b (e.g., in opposite directions) to move one or both of the retainer and pusher flights 70 and 68 such that a distance between the retainer and pusher flights is increased or decreased to accommodate the new slug size as step 92. At step 94, once the new distance between the retainer flight 70 and the pusher flight 68 is set, the controller 86 causes the retainer flight 70 and the pusher flight 68 to move together in a continuous loop such that the distance between the retainer and pusher flights remains substantially the same to transfer the new slug size of cookie sandwiches from the counting conveyor 14 to the tray loading regions 18.

Figure 10:
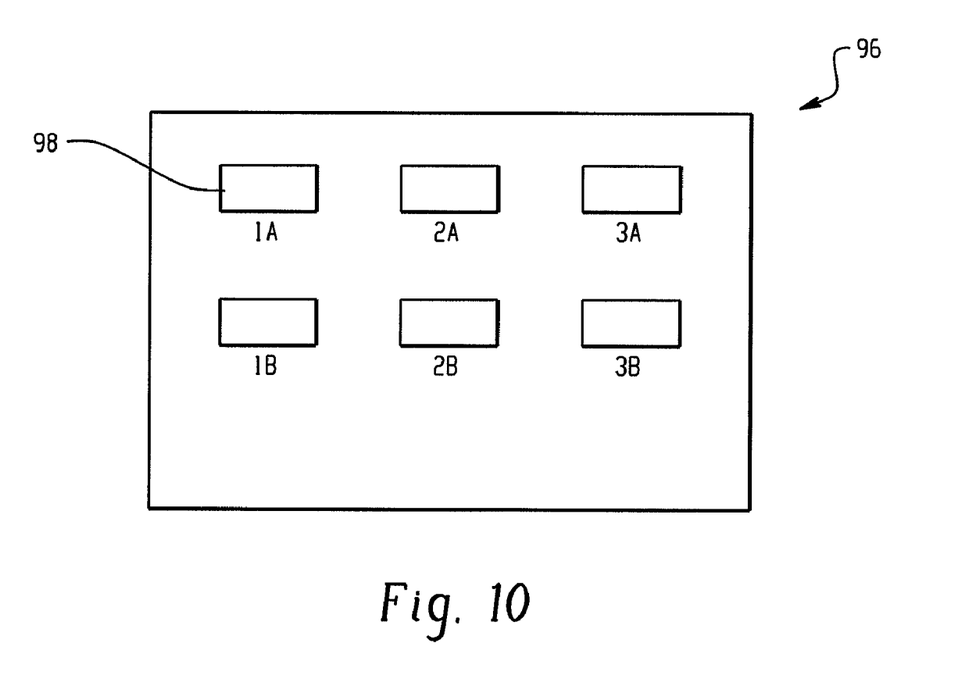
FIG. 10 is a diagrammatic illustration of an embodiment of a display for use in controlling the flight adjustment system of FIG. 8.

Referring now to FIG. 10, the user input device 84 (e.g., including a touch screen display) may utilize software that generates a graphical user interface 96 providing a number of graphical elements 98 to facilitate interaction between the operator and the flight adjustment system 82. Each graphical element 98 can correspond to a particular cookie type and slug size (or recipe) saved in memory of the flight adjustment system 82. For example, cookie 1A through cookie 3A may correspond to a two-layer cookie sandwich where cookie 1A has a slug size of 14 cookies, cookie 2A has a slug size of 16 cookies and cookie 3A has a slug size of 20 cookies. Cookie 1B through cookie 3B may correspond to a three-layer cookie sandwich where cookie 1B has a slug size of 6 cookies, cookie 2A has a slug size of 8 cookies and cookie 3A has a slug size of 10 cookies. The graphical elements 98 may also provide a visual indication of the cookie type corresponding to the selection. For example, the graphical elements 98 may include a graphical representation of the packaging for the cookie and/or product name. Text may be provided to indicate the cookie slug size.

In some embodiments, the flight adjustment system 82 may be configured by the operator to set various desired distances (i.e., recipes) between the pusher flight 68 and the retainer flight 70 based on customized or particular tray and/or cookie size requirements and those distances can be saved in memory of the flight adjustment system. Customized graphical elements may be associated with the operator created recipes. Additionally, each recipe can be adjustable by the operator to increase or decrease the distance between the pusher flight 68 and the retainer flight 70 for a particular tray loading operation.

A conveying speed may be associated with a particular recipe. For more fragile cookies, it may be desirable to utilize a slower conveying speed to minimize cookie damage. Conversely, less fragile cookies may be conveyed at higher conveying speeds to increase output of the apparatus 10.

Figure 11:
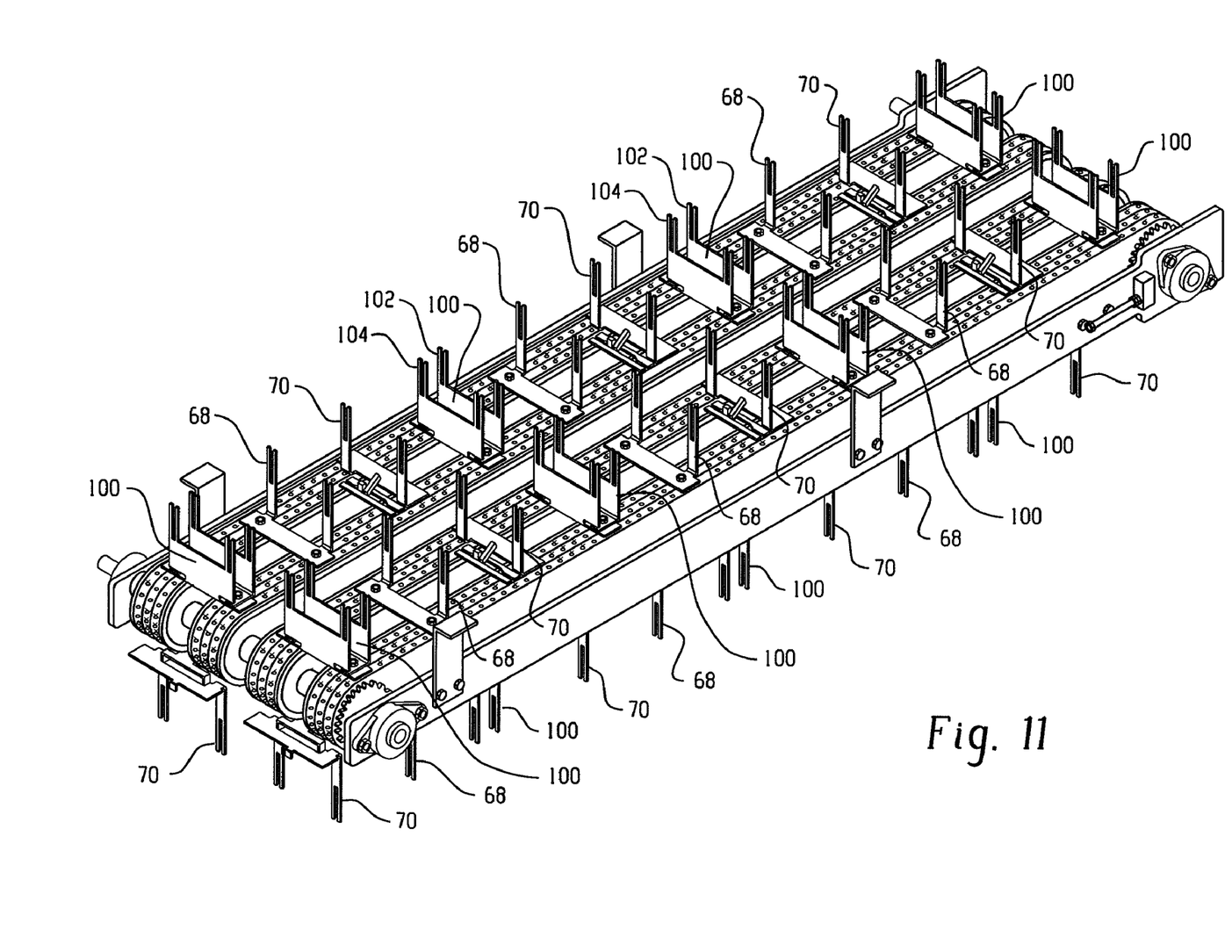
FIG. 11 is another embodiment of an overhead transfer assembly.

The above-described overhead transfer assembly 38 is adjustable for a range of cookie slug sizes, for example, from five to 22 sandwich cookies of about ⅝ inch thickness. FIG. 11 illustrates an alternative overhead transfer assembly embodiment using a double retainer flight assembly 100 in order to accommodate 12 sandwich cookies or less, such as from five to 12 sandwich cookies of about ⅝ inch in thickness. The double retainer flight assemblies 100 are between each pusher and retainer flight 68, 70 per row. A double retainer flight assembly 100 is placed between each pusher flight 68 and retainer flight 70 when accommodating the smaller slug size range. Fingers 102 of the double retainer flight assemblies 100 serve as retainer fingers for a slug of cookie sandwiches and fingers 104 of the double retainer flight assemblies serve as pusher fingers for a slug of cookie sandwiches.

Use of the double retainer flight assembly 100 decreases the amount of movement needed between the pusher and retainer flights 68 and 70 to transfer the smaller sized slugs. The double retainer flight assemblies 100 can be attached to the outer chain assemblies 54, 54, 56 and 58, the same chain assemblies to which the pusher flights 68 are attached. The retainer flights 70 can then be adjusted relative to the double retainer flight assemblies 100.

The above-described apparatus 10 with adjustable overhead transfer apparatus 20 provides a number of advantages. The distance between the pusher and retainer flights 68, 70 can be adjusted without removing or exchanging parts on the apparatus 10, which reduces machine downtime thereby increasing machine efficiency. The user input device 84 is provided where the operator can select the appropriate recipe, which causes the controller 86 to adjust the distance between the pusher and retainer flights 68 and 70 to a preset distance saved in memory. Various customized recipes can be created and stored in memory to accommodate a number of slug and cookie sizes.

It is to be clearly understood that the above description is intended by way of illustration and example only and is not intended to be taken by way of limitation, and that changes and modifications are possible. Accordingly, other embodiments are contemplated and modifications and changes could be made without departing from the scope of this application.

What is claimed is:

1. An apparatus that loads horizontally oriented slugs of edible, edge-standing items into trays, the apparatus comprising:

a tray delivery mechanism having a tray infeed for receiving trays, a tray outfeed from which filled trays can be removed from the apparatus and a tray conveyor that moves the trays from the tray infeed to the tray outfeed; and an over head transfer mechanism disposed above the tray conveyor, the over head transfer mechanism including a pusher flight and a retainer flight, the pusher flight and retainer flight configured to cooperate to transfer a pre-selected number of edge-standing items forming the slug from a counting conveyor to a tray loading area, the overhead transfer mechanism including a flight adjustment system that adjusts a distance between the retainer flight and the pusher flight to change the pre-selected number of edge-standing items transferred by the over head transfer mechanism from the counting conveyor to the tray loading area, wherein the flight adjustment system comprises a first drive system linked to the retainer flight; and a second drive system linked to the pusher flight, the first and second drive systems configured for movement independent of each other to enable movement of the retainer flight and the pusher flight relative to each other;

a control system, the control system operates during flight adjustment to actuate the first drive system to move the retainer flight in a first direction and to actuate the second drive system to move the pusher flight in a second direction opposite the first direction to establish a selected distance between the retainer flight and the pusher flight, and subsequent to flight adjustment and during a loading operation the control system operates to actuate the first drive system and the second drive system to move the retainer flight and the pusher flight together in the same direction such that the selected distance between the retainer flight and the pusher flight is maintained.

2. The apparatus of claim 1, wherein the retainer flight and the pusher flight are driven by the first drive system and the second drive system in a continuous loop during a loading operation.

3. The apparatus of claim 1, wherein the control system includes memory having a plurality of preset distance values used to adjust a distance between the retainer and pusher flights based on a user input, the preset distance values selected to correspond to different slug sizes.

4. The apparatus of claim 3, wherein the tray conveyor conveys trays in a direction substantially perpendicular to a direction that the edge-standing items are transferred by the over head transfer mechanism from the counting conveyor to the tray loading area.

5. The apparatus of claim 4 further comprising a drop gate located at the tray loading area, the over head transfer mechanism transfers the edge-standing items to the drop gate such that opening the drop gate causes the edge-standing items to drop into the tray.

6. The apparatus of claim 1, wherein the first drive system comprises a first servo motor operatively linked to the retainer flight and the second drive system comprises a second servo motor operatively linked the pusher flight.

7. The apparatus of claim 6, wherein the first and second drive systems include chain assemblies that link the retainer flight and the pusher flight to their respective first and second servo motor.

8. The apparatus of claim 7, wherein the chain assemblies are driven using sprockets.

9. The apparatus of claim 7, wherein the chain assemblies comprise a first outside chain assembly, a second outside chain assembly, a first inside chain assembly and a second inside chain assembly, wherein the retainer flight is connected to the first and second inside chain assemblies and the pusher flight is connected to the first and second outside chain assemblies.

10. A method of loading horizontally oriented slugs of edible, edge-standing items into trays, the method comprising:

moving trays from a tray infeed to a tray outfeed using a tray delivery mechanism, the tray delivery mechanism including a tray conveyor moving the trays from the tray infeed to the tray outfeed;

transferring a pre-selected number of the edge-standing items forming the slug from a counting conveyor to a tray loading area using an over head transfer mechanism disposed above the tray conveyor, the over head transfer mechanism including a pusher flight linked to a first drive system and a retainer flight linked to a second drive system, the pusher flight and retainer flight cooperating to transfer the pre-selected number of edge-standing items forming the slug from the counting conveyor to the tray loading area, the transferring achieved by using the first drive system to move the pusher flight in a first direction and by using the second drive system to move the retainer flight in the first direction, the first drive system and second drive system configured for moving independent of each other to enable movement of the retainer flight and the pusher flight relative to each other; and adjusting a distance between the retainer flight and the pusher flight by using the first drive system to move the pusher flight in one direction and by using the second drive system to move the retainer flight in an opposite direction so as to change the pre-selected number of edge-standing items being transferred by the over head transfer mechanism from the counting conveyor to the tray loading area.

11. The apparatus of claim 10 wherein during the adjusting step a selected distance between the retainer flight and the pusher flight is set; and subsequent to flight adjustment and during a later loading operation actuating the first drive system and the second drive system using a controller to move the pusher flight and the retainer flight together in the same direction such that the selected distance between the retainer flight and the pusher flight is maintained.

12. The method of claim 11 further comprising driving the retainer flight and the pusher flight in a continuous loop during a loading operation.

13. The apparatus of claim 11 further comprising providing the controller with a memory having a plurality of preset distance values used to adjust a distance between the retainer and pusher flights based on a user input, the preset distance values selected to correspond to different slug sizes.

14. An apparatus that forms and loads horizontally oriented slugs of edible, edge-standing items into trays, the apparatus comprising:
a sandwiching system configured to assemble the edge-standing items, the sandwiching system including an infeed and an outfeed;
a tray delivery mechanism having a tray infeed for receiving trays, a tray outfeed from which filled trays can be removed from the apparatus and a tray conveyor that moves the trays from the tray infeed to the tray outfeed; and
an over head transfer mechanism disposed above the tray conveyor, the over head transfer mechanism including a pusher flight linked for movement by a first drive system including a first servo motor and a retainer flight linked for movement by a second drive system including a second servo motor, a control system for controlling operation of the first servo motor and the second servo motor, the control system configured to operate during tray loading such that the first drive system moves the pusher flight in a loading direction and the second drive system moves the retainer flight in the loading direction so that the pusher flight and retainer flight cooperate to transfer a pre-selected number of edge-standing items forming the slug delivered from the outfeed of the sandwiching system to a tray loading area, the control system configured to operate during flight adjustment such that both the first drive system and second drive system are operated to adjust a distance between the retainer flight and the pusher flight to change the pre-selected number of edge-standing items being transferred by the over head transfer mechanism to the tray loading area, and wherein the control system operates during flight adjustment to actuate the first drive system to move the pusher flight in a first direction and to actuate the second drive system to move the retainer flight in a second direction opposite the first direction to establish a selected distance between the retainer flight and the pusher flight, and subsequent to flight adjustment and during a later loading operation actuate the first drive system and the second drive system to move the pusher flight and the retainer flight together in the same direction such that the selected distance between the retainer flight and the pusher flight is maintained.

15. The apparatus of claim 14, wherein the pusher flight and the retainer flight are driven by the first drive system and the second drive system in a continuous loop during a loading operation.

16. The apparatus of claim 14, wherein the control system includes memory having a plurality of preset distance values used to adjust a distance between the retainer and pusher flights based on a user input, the preset distance values selected to correspond to different slug sizes.

* * * * *